United States Patent
Mcfeeters

(10) Patent No.: US 8,515,034 B2
(45) Date of Patent: Aug. 20, 2013

(54) CALL INTERCEPTOR

(76) Inventor: Kenneth Mcfeeters, Belfast (GB)

( * ) Notice: Subject to any disclaimer, the term of this patent is extended or adjusted under 35 U.S.C. 154(b) by 288 days.

(21) Appl. No.: 12/936,602

(22) PCT Filed: Apr. 10, 2009

(86) PCT No.: PCT/EP2009/002688
§ 371 (c)(1),
(2), (4) Date: Oct. 6, 2010

(87) PCT Pub. No.: WO2009/124778
PCT Pub. Date: Oct. 15, 2009

(65) Prior Publication Data
US 2012/0008759 A1    Jan. 12, 2012

(30) Foreign Application Priority Data
Apr. 11, 2008 (GB) .................................. 0806570.8

(51) Int. Cl.
*H04M 11/00* (2006.01)
(52) U.S. Cl.
USPC ............. 379/100.01; 379/207.03; 379/210.02
(58) Field of Classification Search
USPC .............. 379/90.01, 100.01, 100.05, 100.06,
379/100.07, 100.17, 207.03, 210.02, 210.03,
379/213.01; 358/402, 407, 440
See application file for complete search history.

(56) References Cited

U.S. PATENT DOCUMENTS

| 6,034,687 A | 3/2000 | Taylor et al. |
| 6,057,945 A | 5/2000 | Baba |
| 8,121,273 B2 * | 2/2012 | McFeeters ............... 379/100.16 |
| 2003/0152198 A1 | 8/2003 | Price |

FOREIGN PATENT DOCUMENTS

| EP | 0825760 A2 | 2/1998 |
| WO | 2007051609 A1 | 5/2007 |

OTHER PUBLICATIONS

International Search Report for PCT/EP2009/002688, Completed by the European Patent Office Jul. 15, 2009, 3 Pages.

* cited by examiner

*Primary Examiner* — Antim Shah
(74) *Attorney, Agent, or Firm* — Brooks Kushman P.C.

(57) ABSTRACT

An apparatus for selectively allowing calls to a device, such as a fax machine, that may receive calls on a signal line. The apparatus is arranged to, upon detecting an incoming call, initiate a blocking period during which the incoming call is prevented from reaching the device, and to terminate the blocking period when a predetermined threshold, for example a number of rings or period of time, has elapsed, and upon termination of the blocking period to initiate said enabled time period. Hence, incoming calls are not prevented from reaching the device if their duration exceeds the predetermined threshold. The apparatus helps to reduce the number of unwanted calls being received since spam calls commonly emanate from automated sending devices with a ring duration that is typically less than that of legitimate callers.

17 Claims, 3 Drawing Sheets

CALL INTERCEPTOR

FIELD OF THE INVENTION

The present invention relates to call interception and especially, but not exclusively, to the interception of facsimile transmissions.

BACKGROUND TO THE INVENTION

International PCT Patent Application No. PCT/EP2006/010498 discloses a device for intercepting unwanted facsimile transmissions. It would be desirable to improve on the device of PCT/EP2006/010498.

SUMMARY OF THE INVENTION

Accordingly, a first aspect of the invention provides an apparatus for selectively allowing calls to a device that may receive calls on a signal line, the apparatus including means for detecting an incoming call on the signal line; and means for allowing the incoming call to reach the device if received during an enabled time period and preventing the incoming call from reaching the device if received outside the enabled time period, the apparatus being arranged to, upon detecting an incoming call, initiate a blocking period during which the incoming call is prevented from reaching the device, and to terminate said blocking period when a predetermined threshold, for example a number of rings or period of time, has elapsed, and upon termination of said blocking period to initiate said enabled time period.

Hence, incoming calls are not prevented from reaching the device if their duration exceeds said predetermined threshold.

Preferably, the apparatus includes an indicator, e.g. an audio or visual indicator, that indicates to a user the status of the apparatus, e.g. indicating whether or not the apparatus is implementing a blocking period. This enables the user to decide whether or not to answer the call, or to cause the device to answer the call. For example, in the case where the device is a telephone, the user may decide to answer the incoming call once the device has indicated that the blocking period is over since this is an indication that the call is legitimate.

Optionally, the apparatus is provided with input means for allowing the user to adjust, and especially to increase, the predetermined threshold. This is particularly useful if the user finds that the device is still receiving unwanted calls after the apparatus has set the threshold itself.

Advantageously, the apparatus includes the means for monitoring, and typically also recording, the characteristics of incoming calls, said characteristics including the duration of the ring period before ringing off (measured in, for example, time and/or number of rings); interval between ringing off and redialling; and/or time of day at which incoming call is received, and being arranged to set said threshold for said blocking period depending on one or more of said monitored characteristics of the incoming calls.

To this end, during the monitoring period the apparatus preferably blocks at least some incoming calls so that they are prevented from reaching the device, to enable the apparatus to monitor the duration of the incoming call before ringing off.

In this mode of operation, the apparatus initiates the enabled time period after the threshold has expired irrespective of whether or not the incoming call has terminated, i.e. rung off. This means that incoming calls with a ring duration (i.e. the length of time or number of rings before the calling device terminates the attempted call) longer than the set threshold will be received by the device without the caller having to redial, while incoming calls that ring for a duration less than the said threshold will be prevented from reaching the device.

In preferred embodiments, the apparatus is operable in an alternative mode of operation in which the apparatus is arranged to prevent a first incoming call, detected outside said enabled period, from reaching said device and subsequently to initiate said time period. In this mode of operation, it is preferred that the enabled time period is not initiated until after the apparatus determines that said first incoming call has rung off.

In the preferred embodiment, the enabled time period is initiated in response to receiving a first incoming call after a quiescent period, outside of an enabled time period.

The apparatus may selectably block incoming calls by making or breaking the signal lines as appropriate, and/or by causing a signal to be sent on said signal line to the device sending the incoming call indicating that the receiving device is busy or otherwise unavailable (thereby effectively disabling the signal line).

The apparatus may adopt a normally enabled state in which the signal line is normally enabled (i.e. at least incoming calls are allowed to be received, the signal line being disabled (i.e. at least incoming calls are blocked by, for example, breaking the signal line or sending a busy/unavailable signal thereon) in response to detecting said first incoming call.

Alternatively, the apparatus may adopt a normally disabled state, the signal line being enabled only during said enabled time period.

The apparatus may include a switching device for selectably making or breaking the signal line.

A second aspect of the invention provides a method of selectively allowing calls to a device that may receive calls on a signal line, the method including detecting an incoming call on the signal line; allowing the incoming call to reach the device if received during an enabled time period; preventing the incoming call from reaching the device if received outside the enabled time period; initiating, upon detecting an incoming call, a blocking period during which the incoming call is prevented from reaching the device; terminating said blocking period when a predetermined threshold, e.g. a number of rings or a period of time, has elapsed; and initiating, upon termination of said blocking period, said enabled time period.

In preferred embodiments, once a call has been received and allowed during the enabled time period, the signal line is enabled until the apparatus determines that the call has ended. This may be achieved by monitoring signal activity or voltages and/or currents on the signal line.

Preferred features are recited in the dependent claims and further advantageous aspects of the invention will become apparent to those ordinarily skilled in the art upon review of the following description of specific embodiments and with reference to the accompanying drawings.

BRIEF DESCRIPTION OF THE DRAWINGS

An embodiment of the invention is now described by way of example and with reference to the accompanying drawings in which like numerals are used to indicate like parts and in which.

DETAILED DESCRIPTION OF THE DRAWINGS

Figure 1:
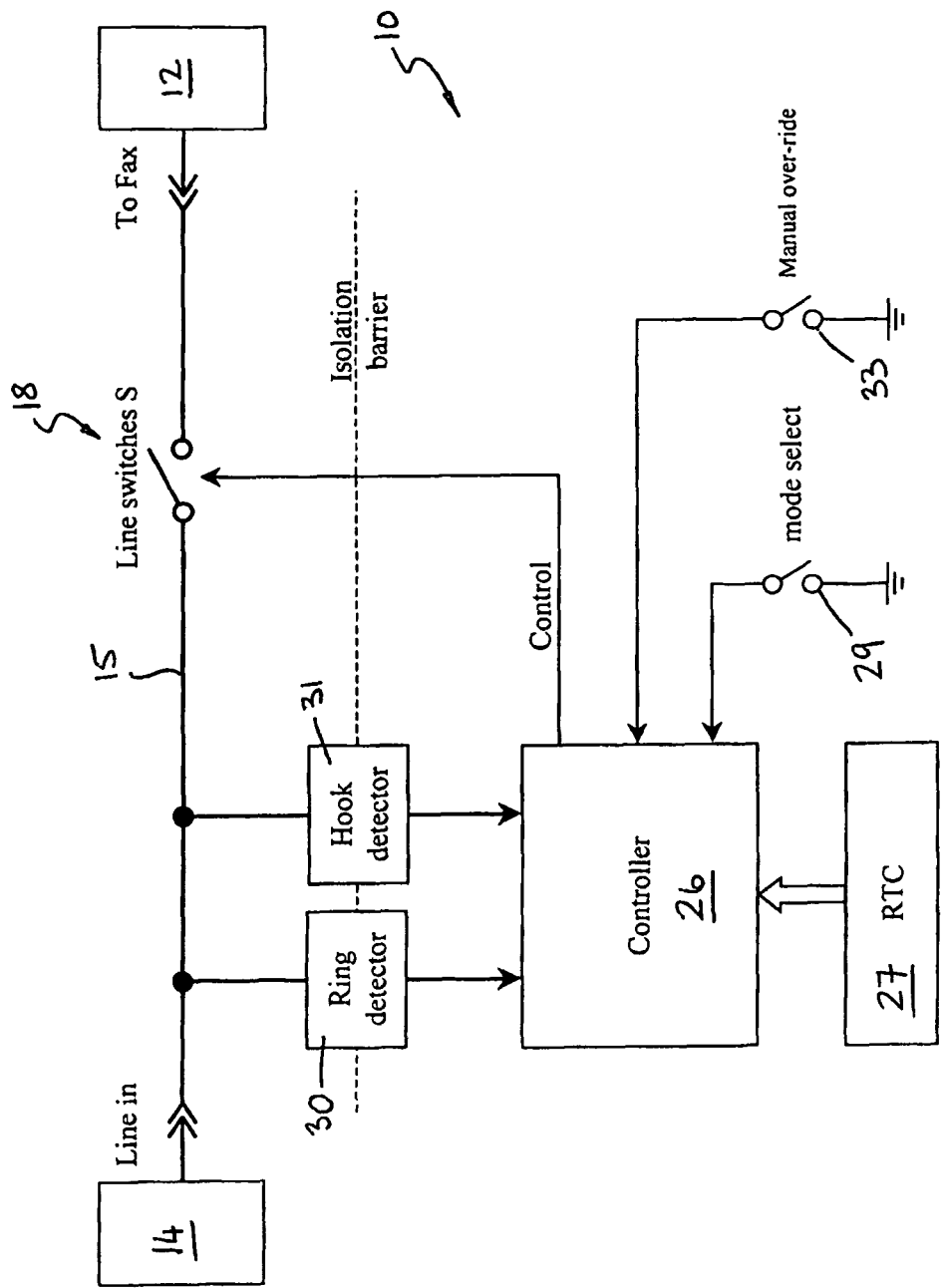
FIG. 1 is a block diagram showing an apparatus embodying the invention.

Referring now to the drawings, there is shown, generally indicated as 10, an embodiment of an apparatus for intercepting calls. The apparatus 10 is connectable between a call receiving device in the form of, for example, a facsimile machine 12, and a socket 14. The socket 14 provides a connection point to a communications network (not shown), for example a public standard telephone network (PSTN) and/or a computer network. Hence, the facsimile machine 12, or other device, may send and receive calls or transmissions to and from other devices (not shown) e.g. other facsimile machines, across the communications network. The term "calls" is intended to embrace any data transmission from one device to another and, in the present embodiment is particularly intended to embrace facsimile transmissions. In alternative embodiments, the call receiving device need not necessarily comprise a facsimile machine—it may comprise any device capable of receiving a call or data transmission on a line that can be blocked, especially a PSTN line or a mobile (cellular) telecommunications network line. For example, the call receiving device may comprise a telephone or computing device. Typically, the call receiving device is also capable of making outgoing calls.

Figure 3:
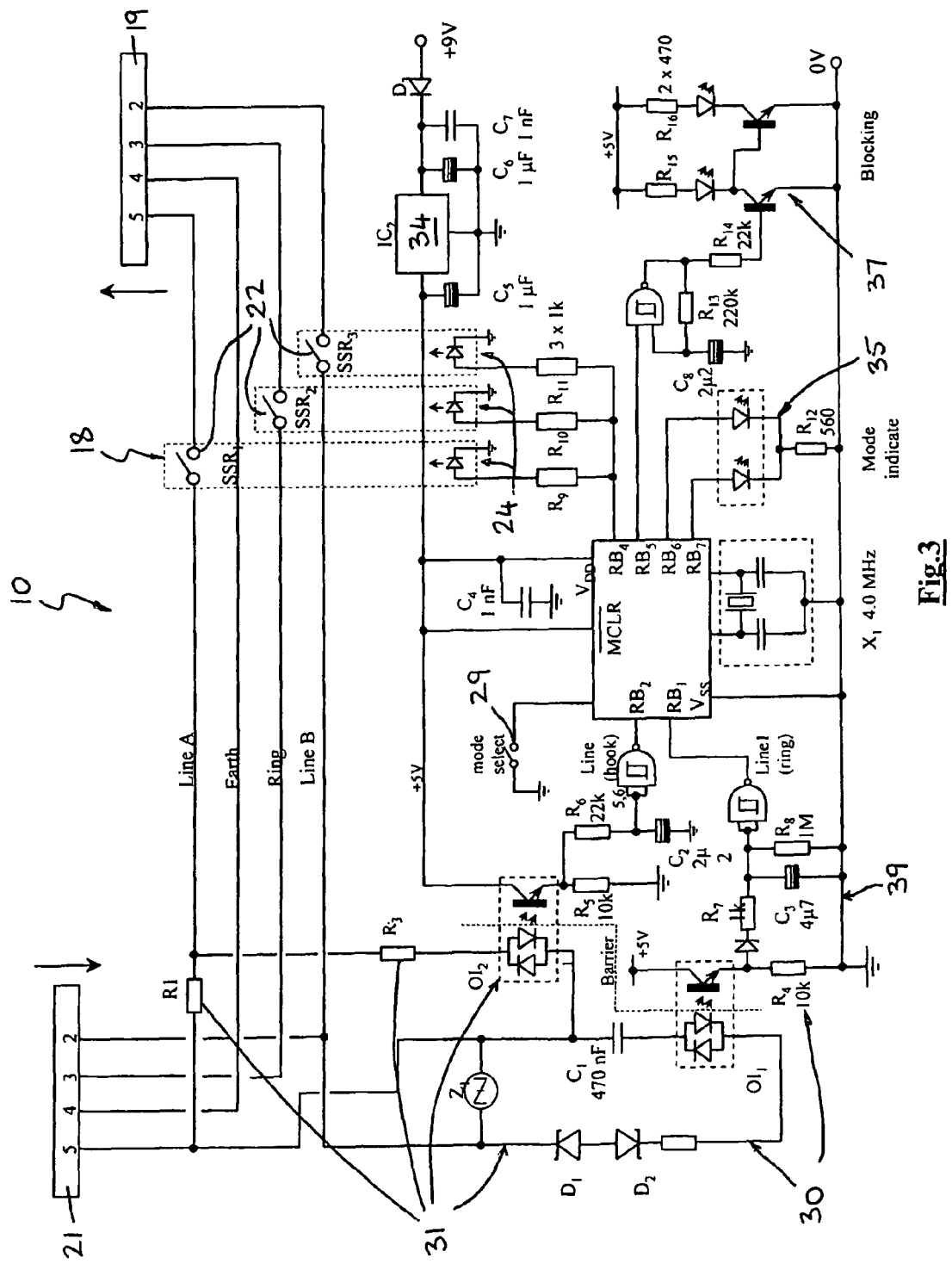
FIG. 3 is a schematic diagram showing a specific embodiment of the apparatus of FIG. 1.

In use, calls are sent between the socket 14 and the device 12 via a signal line 15. Calls typically take the form of electrical signals and so signal line 15 is typically provided by one or more electrical signal carriers or cables. In the case where the socket 14 provides a connection to a PSTN, the line 15 is typically provided by an electrical cable comprising 4 wires or carriers 16 (FIG. 3). During use, the line 15 provides part of a signal path between the apparatus 12 and any one of said other apparatus connected to the network. In the examples described herein, the line 15 is assumed to be a conventional fax/phone line.

Conventionally, a fax line is provided by a cable connected directly between the socket 14 and the fax machine 12. When the apparatus 10 is installed, the line 15 is selectably connectable to the fax machine 12 via the apparatus 10 as is described in more detail below. Typically, the line 15 is carried between the socket 14 and the apparatus 10 by a first cable, and between the apparatus 10 and the fax machine 12 by a second cable, the apparatus 10 itself also providing part of the line 15. This can be seen from FIG. 3 where the apparatus 10 includes signal carriers 16 which provide, in use, part of the signal line. The line 15 is provided between first and second connectors 19, 21, the first connector 19 be connected in use to socket 14 and the second connector 21 being connected in use to the device 12.

The apparatus 10 includes a switching device 18 which, when the apparatus 10 is installed, is incorporated into the line 15. In an open state, the switch device 18 breaks the line 15 thereby preventing calls from reaching, i.e. being received by, the fax machine 12. In a closed state, the switch device 18 makes the line 15 so that calls are transmitted to, or received by, the fax machine 12.

FIG. 3 shows an embodiment of the switching device 18. The switching device 18 comprises a plurality of switch contacts 22 each controlled by a respective relay device 24. For a conventional 4-wire fax line, a respective switch contact 22 is incorporated into 3 of the wires 16. Each switch contact 22 can make or break a respective wire 16 depending on the state of the relay device 24. Alternatively, each switch contact 22 may be operable by a common device (not illustrated). The switching device may take any other suitable forms, e.g. isolated bipolar switches or electromechanical relays. It will be apparent that the number of switch devices 24 provided, and their location, may vary depending on the composition of the line 15, which may have more, or fewer, than 4 carriers 16.

A control unit 26 is provided for controlling the state of the switching device 18. In the embodiment of FIG. 3, the control unit 26 controls the switching device 18 by causing the relays 24 to be energised or de-energised by applying appropriate voltages to the relays 24, e.g. 5 volts to energise and 0 volts to de-energise. In embodiments where the switches consume relatively high energy, the switching device 18 adopts a normally closed state and so, in order to reduce power consumption, the relays 24 are advantageously arranged such that de-energisation corresponds to the closed state of switch contacts 22, while energisation corresponds to the open state. In the present example, however, the switch device 18 is normally open and must be energised to close (e.g. by application of a control voltage of, say, 5V). Normally closed switches can be advantageous since they provide a "fail safe" mode in which the apparatus 12 is able to send and receive calls should the device 10 fail. A bypass switch device (not shown) may be provided in the device 10 which, when activated, causes the apparatus to be connected to the line 15 in order to send and receive calls irrespective of the condition of the device 10.

The control unit 26 conveniently comprises a suitably programmed micro-controller or microprocessor, but may comprise any other suitable data processor, controller or digital logic circuit. The control unit preferably includes, or is associated with, a timer, conveniently a controllable pre-programmable timer (not shown). Advantageously, a real time clock (RTC) 27 is also provided, the RTC 27 being in communication with the controller 26 for providing information such as the time of day and optionally the date, and to allow time characteristics of incoming calls, e.g. ring duration (i.e. the length of time or number of rings before the calling device terminates the attempted call), and/or the time of day at which a call is received, to be recorded by, and if appropriate acted upon by, the controller 26.

The apparatus 10 further includes a ring, or line status, detection unit 30. The detection unit 30 is coupled to the line 15 in order to detect the presence of, in particular, an incoming call. Conveniently, this may be achieved by monitoring the voltages or currents on the wires 16. When the detection unit 30 detects an incoming call, it sends a signal (e.g. a monostable pulse or a repetitive pulse train) to the control unit 26 thereby alerting the control unit 26 to the incoming call. In the preferred embodiment, the detection unit 30 is configured to monitor the line 15 to detect at least incoming calls and preferably to detect and distinguish between incoming and outgoing calls and to send a signal to the control unit 26 indicative of whether an incoming or outgoing call has been detected. This may be achieved by recognising respective signal (e.g. current and/or voltage) characteristics on the line 15. For example, an incoming call typically produces an oscillating signal on the line 15, whereas an outgoing call is typically preceded by a single step voltage and/or current change on the line 15 as the machine 12 transfers from an on-hook state to an off-hook state. Preferably, the detector 30 sends a signal to the controller 26 that is indicative of the signal detected on the line 15, and the controller 26 interprets the signal received from the detector 30 in accordance with its programming. For example, the off-hook condition may draw current from the line 15, and this may be used to provide a suitable signal for the detector 30 (or hook status detector 31 described hereinafter).

The apparatus 10 may include its own power supply (not shown) which may take the form of one or more batteries, or may receive an isolated AC mains derived supply. A voltage regulator 34 may also be provided to ensure that an appropriate power supply is provided to at least some of the components of the apparatus 10 (e.g. the control unit 26 and the switching device 18 in the example of FIG. 1). In the illustrated embodiment, the apparatus 10 is arranged to receive a power supply (9V in this case) from an external source.

The apparatus 10 preferably also includes a hook status detector 31 coupled to the line 15 and arranged to detect whether or not the fax machine 12 is off hook or on hook, i.e. whether or not it is currently receiving or sending calls. This may be achieved by any suitable means, typically by monitoring the voltages and/or the currents on one or more of the signal carriers 16 that make up the line 15. Preferably, the controller 26 and associated circuitry is electrically isolated from the line 15 by, or example, the use of opto-isolators 40 in the ring detector 30 and hook detector 31 (see FIG. 3). Preferably, the minimum line isolation is approximately 5 kV.

The controller 26 is configured to monitor the duration of, and preferably also the interval between, all incoming calls. The duration of incoming calls may be measured by, for example, the duration in seconds, or other units of time, and/or the number of rings before ringing off. In order to perform this monitoring, the controller 26, upon detecting an incoming call, causes it to be blocked such that it is not answered by the fax machine 12. This means that the incoming call will ring for its full duration before ringing off and so allows the controller 26 to record this information. The controller 26 may use the RTC 27 to record the duration of the incoming calls and, optionally, to record the time of day, and preferably also the date of the calls. Hence, the controller 26 is able to compile a log of received calls. Typically the log is compiled over a period of days. The controller 26 is further arranged to analyse the data contained in the log and to set one or more operating parameters depending on this analysis. In the preferred embodiment, the operating parameters include: Tg—this is a gate period, and in at least a first mode of operation, sets a period for which the apparatus 10 may allow an incoming call to reach the fax machine 12 after having blocked an incoming call after a quiescent period; Tb—this is the duration of a period in which the apparatus 10 blocks the line 15 upon detection of an incoming call after a quiescent period; Th—this is the duration of a period after Tb has expired during which the apparatus 10 allows the device to receive incoming calls before returning to its quiescent (on guard) state.

In the preferred embodiment, the controller 26 analyses the log data to determine patterns in the duration of and/or the interval between the monitored incoming calls. This allows the controller 26 to determine which calls are perceived to be unsolicited or "spam" calls and which are genuine calls. For example, spam calls (which tend to be automated) tend to have relatively short ring durations but relatively long intervals between redial (typically an automated fax machine will terminate the call after approximately 20-30 seconds if unanswered, whereas a legitimate call may ring for around 50 seconds before ringing off). Also, automated fax machines tend to call at certain times of the day. Hence, by assessing some or all of the log information, the controller 26 is able to decide which calls are wanted calls and which calls are unwanted calls. Once this decision has been made the controller 26 is able to set one or more of the parameters Tg, Tb and/or Th. For example, the controller 26 may determine that some incoming calls redial after a relatively short interval, say 3 or 4 minutes, in which the controller 26 may set Tg to a corresponding duration, e.g. 3 or 4 minutes (or slightly longer) on the assumption that these calls are not spam. As indicated above, in deciding on whether or not such calls are "wanted" calls the controller 26 may also take into account the duration of the ring period and/or time of day of the call. As a further example, the controller may determine that the "unwanted" calls have a relatively short ring period of, say, around 30 seconds and so may set Tb to be approximately 30 seconds, or slightly higher. Th may be determined by, for example, calculating the difference between the determined ring period of "wanted" calls and the determined ring period of "unwanted" calls. Alternatively, any or all of the operating parameters may be determined by any other means, e.g. selected manually, for example by means of a user input switch for adjustment of any device-learned parameters. A visual indicator, e.g. LEDs or a screen, may be provided for indicating the operating status or mode of the device 10. Further, the controller 26 may determine when, during the day, the gate period Tg is implemented.

In order to perform the functions described above, the controller 26 is typically of the microprocessor/micro controller type supporting a suitable computer program.

Figure 2A:
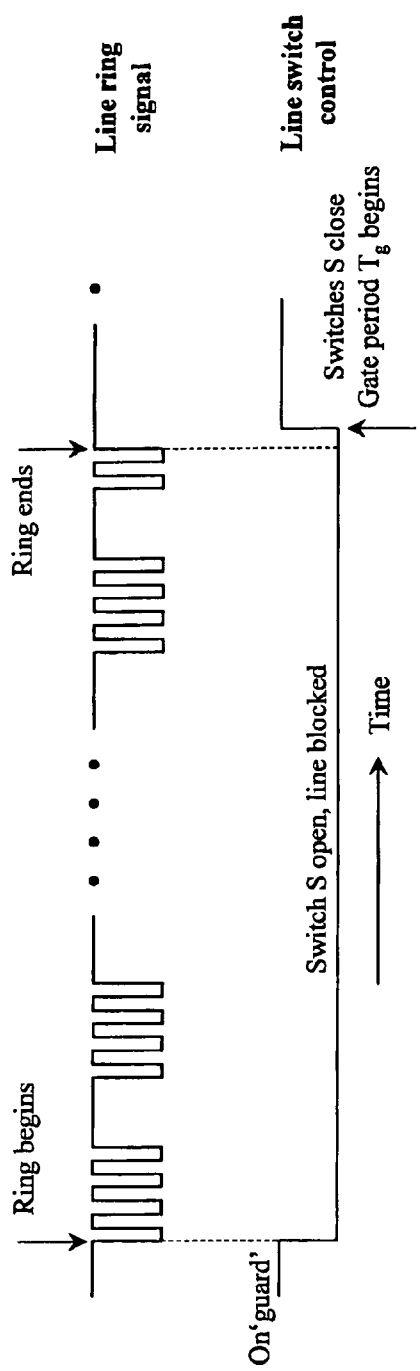
FIG. 2A is a signal diagram illustrating the operation of the apparatus in a first mode of operation.

The preferred apparatus 10 is capable of operating in two different modes of operation. The first mode of operation involves blocking each incoming call until it rings off and then allowing calls to be received for the period Tg, after which the apparatus 10 returns to its quiescent (or on guard) state in which it blocks the next incoming call and so on. The aim is that legitimate incoming calls will ring back within the period Tg and will thus reach the fax machine 12. This is illustrated in FIG. 2a.

Figure 2B:
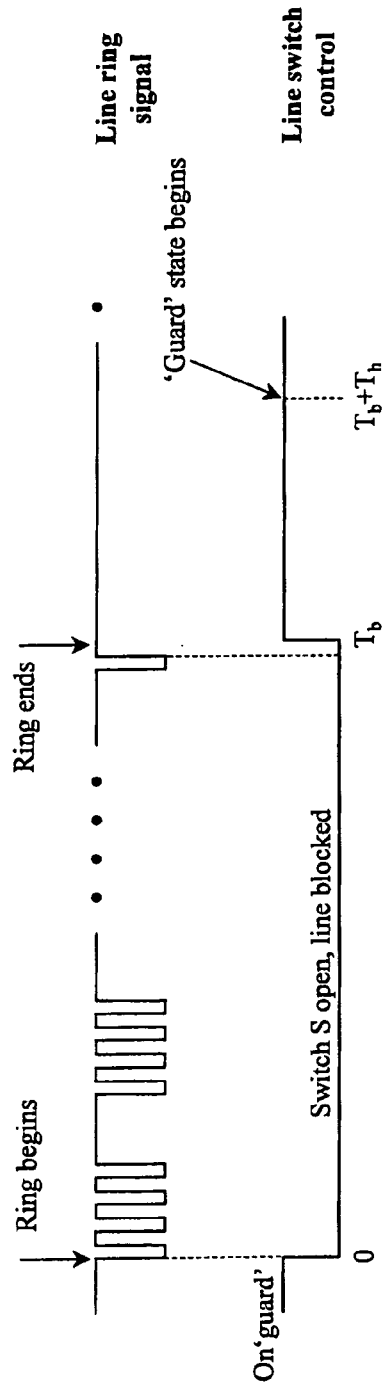
FIG. 2B is a signal diagram illustrating the operation of the apparatus in a second mode of operation.

In the second mode of operation, when, during the quiescent "on guard" state, an incoming call is detected, the line 15 is blocked for the period Tb after which it is unblocked (i.e. calls are allowed to reach the fax machine 12) for the period Th. After the period Th has expired, the apparatus 10 returns to its quiescent "on guard" state. In this case, the line 15 is unblocked again irrespective of whether or not the incoming call has rung off, i.e. the lines are unblocked after the period Tb has expired and this is not dependent on whether or not the incoming call has terminated. In this case, because Tb is selected to be longer than the typical ring duration of unwanted calls, but shorter than the typical ring duration of wanted calls, the desired effect is that unwanted calls are blocked while wanted calls are not blocked. This means that a wanted call can be received without its sender having to redial. This is illustrated in FIG. 2b. An audio or visual indicator (not shown) may be provided which is operable to indicate when the device 10 is implementing the period Th. This would be particularly useful where the device 10 is monitoring for unwanted telephone calls as opposed to fax calls.

Advantageously, the controller 26 is arranged only to return the apparatus 10 to its quiescent state after Th or Tg has expired if the hook state detector 31 indicates that the fax machine 12 is "on hook", i.e. not actively receiving, or sending, a call. If the fax machine 12 is off hook when Tg or Th expires, then the controller 26 preferably causes the apparatus 10 to return to its quiescent state as soon as it determines that the on hook state has been adopted. Calls may also be transmitted normally after Th or Tg has expired, off hook having been sensed.

In order to facilitate the selection of the first or second modes of operation, a mode selection switch 29 is provided.

A further mode of operation may be supported in which Tb and Th are set to predetermined values (for example Tb equals 35 seconds and Th equals 15 seconds). This mode of operation is useful when, for example, the apparatus 10 is logging calls during an initial operating period. To facilitate this mode of operation a manual override switch 33 may be provided.

In the first mode of use, the switching device 18 preferably adopts a normally closed state in which calls are allowed to be sent from and to be received by the fax machine 12. When a first incoming call is detected by the call detection unit 30 after a quiescent period (outside of the time period during which calls are allowed), the control unit 26 is notified and causes the switching device 18 to open before the incoming call can be received by the fax machine 12. Hence, the call is prevented from reaching the fax machine 12 because the switching device 18 is open. Accordingly, the machine making the call determines that the fax machine 12 is unavailable, not answering or engaged and so terminates the attempted call.

The control unit 26 then causes the switching device 18 to adopt the closed state. For a predetermined, and preferably adjustable, period of time thereafter (Tg), the control unit 26 is programmed to take no action to block incoming calls. The control unit 26 may use the timer to determine the length of time for which incoming calls are allowed to reach the fax machine 12. Hence, the control unit 26 and the timer together create an enabled, or gate, time period Tg during which the switching device 18 remains closed and incoming calls are able to reach the fax machine 12.

When the detector 30 detects an outgoing call, the control unit 26 need take no action and the outgoing call is able to be transmitted.

In an alternative embodiment (not illustrated), the switching device 18 may be configured to adopt a normally open state, the control unit 26 being arranged to close the switching device 18 for a finite period of time after an initial call is blocked, and to close the switching device 18 whenever an outgoing call is detected.

In the preferred embodiment, the period of time for which incoming calls are allowed is set to be greater than the typical re-dial period for a conventional fax machine but less than the typical re-dial period for a typical automated "spamming" or junk fax machine. For example, conventional fax machines typically re-dial an engaged or unavailable number after approximately 3 minutes. Accordingly, the control unit 26 may be configured to allow incoming calls for, for example, approximately 5 minutes. Hence, when a conventional fax machine—which is assumed to be trying to send a genuine message to the fax machine 12—re-dials the number of the fax machine 12, the incoming call will now be received by the fax machine 12. Similarly, if a user manually re-dials the number of the fax machine while the switching device 18 is closed, then the re-sent call will be received. However, an automated "spamming" fax machine typically re-dials after a longer period—perhaps after one or more hours. It is probable, therefore, that when the spamming machine re-dials, its call is again treated as a first incoming call after a quiescent period and is therefore blocked by the switching device 18. The period for which incoming calls are allowed is preferably adjustable, for example for periods of between 1 and 10 minutes. Preferably, this period Tg is set by the controller 26 based on its analysis of the logged data as described hereinbefore. In this way, the device 10 may be said to be semi-intelligent or self-learning.

In preferred embodiments, once an incoming call reaches the machine 12, the controller 26 monitors the line 15, via the detector 30, in order to detect the end of the call. This may be achieved by detecting a quiescent state (i.e. the absence of signal activity) on the line 15 after the incoming call is received. To avoid mis-detection of the end of a call by interpreting say a pause in the call at the end of the call, the controller is programmable to only determine that the end of a call has occurred when activity on the line has ceased for at least a pre-determined period. If an allowed call lasts longer than the period for which incoming calls are allowed, then the controller 26 may be arranged to block the next call detected after the allowed call has ended. The controller 26 may be arranged to block the next call detected after an allowed call has ended, irrespective of whether or not the period for which incoming calls are allowed has expired.

In a further mode of operation, the device 10 operates using a combination of the first and second modes. For example, when an incoming call is detected after a quiescent period, the device 10 operates in the first mode of operation such that the incoming call is blocked and rings off, not having been received by the machine 12. Then, during the subsequent gate period Tg of the first mode, the device 10 operates in the second mode of operation such that incoming calls that are detected during the gate period Tg are only received by the machine 12 if their call duration exceeds Tb. This increases the chance of blocking automated calls that implement a rapid re-dial policy. In such cases, it is preferred if Tg exceeds Tb, and preferably also Tb plus Th. Alternatively, the device 10 may be arranged not to return to the quiescent state until after Th has expired.

Referring now in particular to FIG. 3, the detectors 30, 31 are electrically connected to the line 15 at two of the wires 16 in order to monitor signals present on the wires 16. The detectors 30, 31 are advantageously coupled to the controller 26 by means of opto-isolators 40 so that the detected lines signals can be communicated to the controller 26 while the detectors 30, 31 are electrically isolated from the controller 26. It will be seen from the embodiment of FIG. 3 that the ring detector 30 and the hook state detector 31 may share a common coupling circuitry to the line 15.

The apparatus 10 may include one or more lamps e.g. LED 35 for indicating which mode of operation is currently selected. To this end, LED 35 may be a bi-colour LED.

One or more further lamps, e.g. LEDs 37, may be provided to indicate that call blocking is taking place. In the illustrated embodiment, output RB5 of the controller 26 is used to start a low-frequency NAND gate oscillator for driving the LEDs 37 in the blocking mode.

Advantageously, the ring detector 30 comprises a charge pump circuit 39 that enables the detector to signal to the controller 26 relatively quickly when a call is detected. This allows the apparatus 10 to respond very quickly to detect a call and to enable it to block an incoming call relatively quickly. The preferred ring detector 30, and preferably also hook state detector 31, circuits are designed for a fast response when a ring signal begins, while rejecting line borne or terminal open transience. The circuit 39 has a slow decay to prevent drop-out during the inter-ring gap, and also gives protection from line noise by virtue of RC low pass filtering action. A low pass filter comprising resistor R6 and capacitor C2 is advantageously provided in the hook detector 31 to mitigate the effects of line noise. In use, when an incoming call arrives, pin 3 of the opto-isolator 40 in the detector 30 is switched to the high voltage state (5V in this example), causing capacitor C3 to charge with a relatively short time constant of, in this case, 4.7 ms. On the negative part of the cycle, the diode in series with pin 3 prevents C3 from discharging via resistor R4. As a result, input RB1 to controller 26 is triggered with a minimum delay. During periods when pin 3 is "low" (0V in this example), e.g. between "rings" of an incoming call, C3 discharges with a time constant (approx. 4.7 s in this case, as determined by the value of resistor R8)

that is long enough to prevent drop-out in the gap (typically no more than 2 s) between successive ring signal envelopes.

In FIG. 3, conventional electrical and electronic symbols and notation are used to represent electrical and electronic components as will be understood by a skilled person. Any component values provided in FIG. 3 are provided by way of example and are not limiting to the invention. It will be understood that the specific circuits shown in FIG. 3 are provided as examples of how the apparatus of FIG. 1 may be implemented and that alternative implementations are possible, as would be apparent to a skilled person.

In the illustrated embodiment, the switching device 18 is presented as breaking the line 15 in order to block incoming calls. It will be understood that, in alternative embodiments (not illustrated), apparatus may be arranged to block incoming calls in any other convenient manner. For example, the apparatus may include a device for sending a signal, via the line 15, to the sender of the incoming call indicating the line 15 is busy or otherwise unavailable. The device may be included in the control unit, or be separate from but controlled by the control unit. Conveniently, the device is connected to the line 15 in order to place electrical signals thereon which simulate, say, a busy or unavailable condition. Alternatively, the device may be configured to transmit an audio or voice message on the line 15, for example in a manner similar to that of a fax/telephone answering machine. Alternatively still, the apparatus 10 may include means for selectably preventing the fax machine 12 from receiving an incoming call by, for example, preventing it from picking up the call. The sending fax machine may therefore receive a signal indicating that the fax machine 12 is not answering its call. In the embodiments envisaged above, it is preferred that the apparatus also includes a switching device the same or similar in functionality to the switching devices 18 described above.

In a further alternative embodiment, the apparatus may be arranged to create one or more enabled time periods which correspond to respective periods in a 24 hr clock cycle, calls being allowed to reach the device only if they are received during an enable time period.

The invention is described herein in the context of facsimile transmissions but could equally be used in other applications, for example in blocking calls or texts to a telephone.

The invention is not limited be the embodiments described herein which may be modified or varied without departing from the scope of the invention.

The invention claimed is:

1. An apparatus for selectively allowing calls to a device which is capable of receiving calls on a signal line, the apparatus including:
    means for detecting incoming calls on the signal line; and
    means for allowing incoming calls to reach the device if received during an enabled period and preventing incoming calls from reaching the device if received outside the enabled period,
    wherein in a first mode of operation, the apparatus is arranged to, upon detecting an incoming call, begin measuring ring duration, initiate a blocking period during which the incoming call is prevented from reaching the device, and to terminate the blocking period when the measured ring duration has elapsed, and upon termination of said blocking period to initiate the enabled period such that the incoming call is routed to by the device;
    wherein a second mode of operation, the apparatus is arranged to, upon detecting an incoming call as a redial call, update the measuring ring duration based on the redial call, initiate the blocking period during which the incoming call is prevented from reaching the device, and to terminate the blocking period when a redial interval threshold has been enabled, and upon termination of the blocking period to initiate the enable period such that the incoming call is routed to the device based on the redial interval threshold.

2. The apparatus as claimed in claim 1, wherein the measured ring duration is defined as a number of rings of said incoming call, or a time period.

3. The apparatus as claimed in claim 1, wherein the apparatus is operable in a quiescent state, in which it awaits incoming calls, and an active state in which it implements said blocking period followed by said enabled period, the apparatus transferring from the quiescent state to the active state upon detection of said incoming call, and from the active state to the quiescent state upon expiry of said enabled period.

4. The apparatus as claimed in claim 1, wherein the apparatus is provided with input means for allowing a user to adjust said measured ring duration.

5. The apparatus as claimed in claim 1, wherein the apparatus is further arranged to maintain, in response to detecting that said incoming call has been received by said device during said enabled time period and has not terminated, said signal line in an enabled state until the apparatus determines that said incoming call has terminated such that said incoming call is not terminated by said apparatus.

6. The apparatus as claimed in claim 1, further including means for monitoring at least one characteristic of incoming calls, said at least one characteristic including one or more of: ring duration; interval between ringing off and redialing; and time of day at which incoming call is received, and being arranged to set said measured ring duration for said blocking period depending on one or more of said at least one characteristics of the incoming calls.

7. The apparatus as claimed in claim 1, wherein said apparatus is operable in an alternative mode of operation in which the apparatus is arranged to prevent a first incoming call, detected outside said enabled period, from reaching said device irrespective of its call duration, and subsequently to initiate said enabled period such that said first incoming call may reach said device only if it is initiated again during said enabled period.

8. The apparatus as claimed in claim 7, wherein, in said alternative mode of operation, said enabled time period is initiated only after the apparatus determines that said first incoming call has rung off 9. The apparatus as claimed in claim 7, wherein the enabled time period is initiated in response to receiving a first incoming call after a quiescent period, outside of an enabled time period.

10. The apparatus as claimed in claim 1, wherein the apparatus is arranged to selectably block incoming calls by making or breaking said signal line as appropriate.

11. The apparatus as claimed in claim 7, wherein said apparatus is arranged to, in response to detecting an incoming call after a quiescent period, operate in said alternative mode and, during said enabled period of said alternative mode, to operate in said at least one mode of operation.

12. The apparatus as claimed in claim 1, wherein the apparatus is arranged to selectably block incoming calls by causing a signal to be sent on said signal line to the device sending the incoming call indicating that the receiving device is busy or unavailable.

13. The apparatus as claimed in claim 1, wherein the apparatus adopts a normally enabled state in which the signal line is normally enabled such at least incoming calls are allowed to be received by the device, the signal line being disabled such that at least incoming calls are blocked in response to detecting said first incoming call.

14. The apparatus as claimed in claim 1, wherein the apparatus adopts a normally disabled state, the signal line being enabled only during said enabled time period.

15. The apparatus as claimed in claim 1, wherein the apparatus include a switching device for selectably making or breaking the signal line.

16. The apparatus as claimed in claim 1, further including an indicator that is operable by the apparatus to indicate to a user whether or not the apparatus is implementing a blocking period, and/or whether or not the apparatus is implementing an enabled period.

17. A method of selectively allowing calls to a device that receives calls on a signal line, the method including:
   detecting incoming calls on the signal line;
   measuring ring duration of the incoming calls;
   initiating, upon detecting an incoming call, a blocking period based on the ring duration which time the incoming call is prevented from reaching the device;
   terminating said blocking period after a measured ring duration has elapsed allowing the incoming call to reach the device;
   if the incoming call is terminated before the measured ring duration has elapsed, initializing a redial interval threshold;
   terminating said blocking period during the redial interval threshold allowing the incoming call to reach the device if received within the redial interval threshold; and
   upon completion of the redial call, updating the measuring ring duration to reinitiate the blocking period during which time the incoming call is prevented from reaching the device;
   wherein incoming calls are allowed to reach the device if received during an enabled period and prevented from reaching the device if received outside the enabled period.

* * * * *